US012735989B2

United States Patent
(12) United States Patent
Dilley et al.

(10) Patent No.: US 12,735,989 B2
(45) Date of Patent: Sep. 15, 2026

(54) STATOR VANE ASSEMBLY WITH AN ATTACHMENT ASSEMBLY

(71) Applicants: General Electric Company, Schenectady, NY (US); Safran Aircraft, Engines, Paris Cedex (FR)

(72) Inventors: Devin R. Dilley, Norwood, OH (US); Douglas Lorrimer Armstrong, Needham, MA (US); Elzbieta Kryj-Kos, Liberty Township, OH (US); Celia Iglesias Cano, Paris (FR); Olivier Bazot, Melun (FR)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/871,190

(22) PCT Filed: Jun. 3, 2022

(86) PCT No.: PCT/US2022/032060
§ 371 (c)(1),
(2) Date: Dec. 3, 2024

(87) PCT Pub. No.: WO2023/234946
PCT Pub. Date: Dec. 7, 2023

(65) Prior Publication Data
US 2025/0361816 A1 Nov. 27, 2025

(51) Int. Cl.
*F01D 9/04* (2006.01)

(52) U.S. Cl.
CPC .......... *F01D 9/042* (2013.01); *F05D 2240/12* (2013.01); *F05D 2300/603* (2013.01)

(58) Field of Classification Search
CPC ..... F01D 9/00; F01D 9/02; F01D 9/04; F01D 9/041; F01D 9/042; F05D 2240/12; F05D 2300/603; F05D 2300/6033
See application file for complete search history.

(56) References Cited

U.S. PATENT DOCUMENTS 2,872,156 A 2/1959 Brown
4,884,948 A * 12/1989 Sikorski .................. B64C 11/26
416/240
(Continued)

FOREIGN PATENT DOCUMENTS

GB 2226604 B 10/1992

OTHER PUBLICATIONS

PCT International Search Report & Opinion PCT/US2022/032060 on Sep. 1, 2022.

*Primary Examiner* — Elton K Wong
(74) *Attorney, Agent, or Firm* — McGarry Bair PC

(57) ABSTRACT

A stator vane assembly defining a chordwise direction and a crosswise direction perpendicular to the chordwise direction is provided. The stator vane assembly includes: an attachment plate; and an attachment assembly coupled to the attachment plate, the attachment assembly including: a first flange member attached to the attachment plate and extending along the chordwise direction; a second flange member attached to the attachment plate and extending along the chordwise direction, the first flange member spaced from the second flange member in the crosswise direction; and a crosswise support member extending between the first and second flange members and positioned between the attachment plate and the first flange member and between the attachment plate and the second flange member.

25 Claims, 5 Drawing Sheets

(56) References Cited

U.S. PATENT DOCUMENTS

| | | | | |
|---|---|---|---|---|
| 5,272,869 | A | 12/1993 | Dawson et al. | |
| 6,305,905 | B1 * | 10/2001 | Nagle | B64C 11/04 416/204 R |
| 6,524,072 | B1 | 2/2003 | Brownell et al. | |
| 7,648,336 | B2 | 1/2010 | Cairo | |
| 8,440,045 | B2 | 5/2013 | Bremmer et al. | |
| 8,690,531 | B2 | 4/2014 | Tudor et al. | |
| 9,303,520 | B2 | 4/2016 | Hasting et al. | |
| 9,308,708 | B2 | 4/2016 | Kleinow | |
| 10,443,625 | B2 | 10/2019 | Langenbrunner et al. | |
| 10,751,958 | B2 | 8/2020 | Kray et al. | |
| 10,800,128 | B2 | 10/2020 | Feie et al. | |
| 11,193,391 | B2 | 12/2021 | Iwakiri | |
| 2012/0171025 | A1 | 7/2012 | Tudor et al. | |
| 2015/0176426 | A1 * | 6/2015 | Tutaj | B64C 11/04 416/204 A |
| 2016/0047257 | A1 | 2/2016 | Radomski et al. | |
| 2017/0102006 | A1 | 4/2017 | Miller et al. | |
| 2019/0284945 | A1 | 9/2019 | King | |
| 2019/0390555 | A1 | 12/2019 | Kline et al. | |
| 2021/0108518 | A1 * | 4/2021 | Kray | F01D 5/30 |

* cited by examiner

STATOR VANE ASSEMBLY WITH AN ATTACHMENT ASSEMBLY

FIELD

The present disclosure relates to a stator vane assembly for a gas turbine engine having an attachment assembly.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Traditionally, turbofan engines have included an outer nacelle surrounding the fan assembly. With at least certain configurations, however, it may be desirable to remove the outer nacelle to facilitate a larger diameter fan, which may generate a relatively large amount of thrust. In order to efficiently generate such thrust with the fan, however, it may be desirable to include one or more outlet guide vanes to straighten out a flow from the fan. Improvements to the outlet guide vanes would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
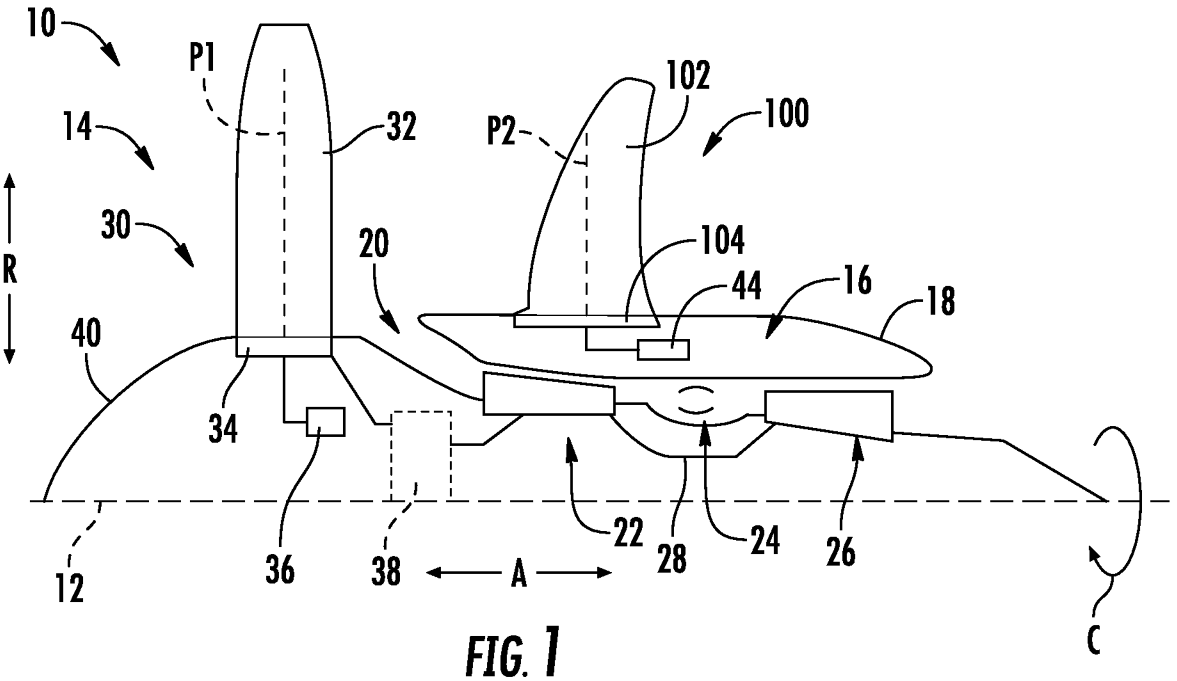
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "coupled," "affixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

As used herein, the terms "integral" and "unitary" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

As noted above, at least certain turbofan engine designs may now exclude an outer nacelle. With such a configuration, the outlet guide vanes may need to be cantilevered (i.e., coupled only at one end) from the turbomachine or other structure. The present disclosure provides for a stator vane assembly that lends itself well to a cantilevered mounting configuration, and further to withstanding relatively large bending forces (e.g., forces in a circumferential direction) as may be required to straighten out the airflow form a large, unducted fan.

In particular, the present disclosure is generally related to a stator vane assembly having an attachment plate and an attachment assembly coupled to the attachment plate. The attachment assembly includes a first flange member attached to the attachment plate and extending along a chordwise direction and a second flange member attached to the attachment plate and also extending along the chordwise direction. The first flange member is spaced from the second flange member in the crosswise direction. Moreover, the attachment assembly includes a crosswise support member extending between the first and second flange members and positioned between the attachment plate and the first flange member and between the attachment plate and the second flange member. The crosswise support member may brace the first and second flange members together and allow the stator vane assembly to withstand greater bending loads.

Additionally, or alternatively, the attachment assembly may include an inner radii support extending between a first radius wall of the first flange member and a second radius wall of the second flange member. The inner radii support may provide a structural backing to the first and second radius walls to similarly allow the stator vane assembly to withstand greater bending loads.

Referring now to the drawings, wherein identical numerals indicate the same elements throughout the Figs., FIG. 1 is a schematic cross-sectional view of a gas turbine engine 10 in accordance with an exemplary embodiment of the present disclosure. More particularly, for the embodiment of FIG. 1, the gas turbine engine 10 is an unducted turbofan engine, as will be explained in more detail below. As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section 22, a combustion section 24, and a turbine section 26 in serial flow order. A shaft 28 (which may additionally or alternatively be a spool) drivingly connects the compressor section 22 to the turbine section 26.

For the embodiment depicted, the fan section 14 includes a fan 30 having a plurality of fan blades 32 coupled to a disk 34 in a spaced apart manner. As depicted, the fan blades 32 extend outwardly from disk 34 generally along the radial direction R. Each fan blade 32 is rotatable relative to the disk 34 about a pitch axis P1 by virtue of the fan blades 32 being operatively coupled to a fan pitch change mechanism 36 configured to collectively vary the pitch of the fan blades 32, e.g., in unison.

Moreover, the turbomachine 16 is drivingly coupled to the fan 30. In particular, as is depicted in phantom, the gas turbine engine 10 may further include a power gear box 38. With such a configuration, the fan blades 32, disk 34, and fan pitch change mechanism 36 may together be rotatable about the longitudinal centerline 12 by shaft 28 across the power gear box 38. The power gear box 38 may include a plurality of gears for adjusting a rotational speed of the fan 30 relative to a rotational speed of the shaft 28, such that the fan 30 may rotate at a more efficient fan speed.

Referring still to the exemplary embodiment of FIG. 1, the disk 34 is covered by rotatable front hub 40 of the fan section 14 (sometimes also referred to as a "spinner"). The front hub 40 is aerodynamically contoured to promote an airflow through the plurality of fan blades 32.

Further, the exemplary gas turbine engine 10 of FIG. 1 additionally includes a stator vane assembly 100 positioned downstream of the fan 30. More specifically, the exemplary gas turbine engine 10 includes an array of stator vane assemblies 100 positioned downstream of the fan 30, spaced from one another along the circumferential direction C. Each stator vane assembly 100 generally includes an outer skin 102 forming an airfoil and an attachment plate 104. For the embodiment FIG. 1, the airfoils of the plurality of stator vane assemblies 100 may be referred to as outlet guide vanes, and the attachment plates 104 of the stator vane assemblies 100 may be coupled to the outer casing 18. In particular, it will be appreciated that the outlet guide vanes may be configured to align an airflow from the fan 30 with the axial direction A to increase efficiency of the gas turbine engine 10.

For the embodiment shown, each stator vane assembly 100 of the plurality of stator vane assemblies 100 is rotatable about a respective pitch axis P2 by virtue of the respective stator vane assembly 100 being operatively coupled to a suitable OGV pitch change mechanism 44. In particular, the attachment plate 104 is coupled to the OGV pitch change mechanism 44 and is rotatable by the OGV pitch change mechanism 44.

Notably, the exemplary gas turbine engine 10 of FIG. 1 does not include an outer nacelle or casing surrounding the fan 30 and stator vane assemblies 100. In such a manner, the gas turbine engine 10 may be referred to as an unducted gas turbine engine, or more specifically an unducted turbofan engine.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a geared gas turbine engine (i.e., including the power gear box 38) and a variable pitch gas turbine engine (i.e., including a fan 30 configured as a variable pitch fan), in other embodiments, the gas turbine engine 10 may additionally or alternatively be configured as a direct drive gas turbine engine (such that the shaft 28 rotates at the same speed as the fan 30), as a fixed pitch gas turbine engine (such that the fan 30 includes fan blades 32 that are not rotatable about the pitch axis P1), or both. Additionally, it will be appreciated that the turbomachine 16 may be configured in any suitable manner. For example, the compressor section 22 may have two or more compressors (e.g., a low pressure compressor and a high pressure compressor) and the turbine section 26 may have two or more turbines (e.g., a high pressure turbine coupled to the high pressure compressor through a high pressure shaft, and a low pressure turbine coupled to the low pressure compressor through a low pressure shaft). Further, the turbomachine 16 may include a ducted fan, e.g., upstream of a first compressor of the compressor section. In at least certain exemplary aspects, a ducted fan stream, sometimes also referred to as a third stream, may extend from a location downstream of the ducted fan and upstream of the first compressor to a bypass passage over the turbomachine 16. It should also be appreciated, that in still other exemplary embodiments, aspects of the present disclosure may be incorporated into any other suitable gas turbine engine 10. For example, in other exemplary embodiments, aspects of the present disclosure may (as appropriate) be incorporated into, e.g., a ducted turbofan engine, a turboprop gas turbine engine 10, a turboshaft gas turbine engine, or a turbojet gas turbine engine.

Figure 2:
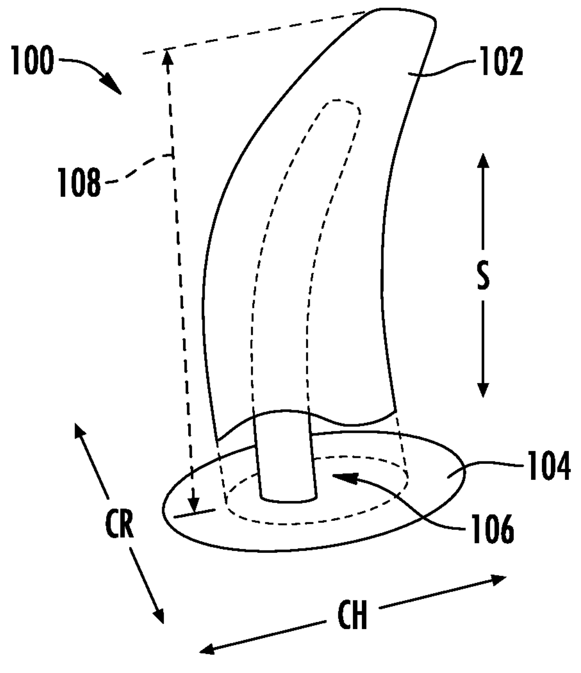
FIG. 2 is a perspective, partial cutaway view of a stator vane assembly in accordance with an exemplary aspect of the present disclosure.

Referring now to FIG. 2, a perspective, partial cutaway view of a stator vane assembly 100 in accordance with an exemplary aspect of the present disclosure is provided. The exemplary stator vane assembly 100 of FIG. 2 may be incorporated into the exemplary gas turbine engine 10 of FIG. 1.

As shown, the exemplary stator vane assembly 100 defines a chordwise direction CH, a crosswise direction CR perpendicular to the chordwise direction CH, and a spanwise direction S. The stator vane assembly 100 generally includes an attachment plate 104, an attachment assembly 106 coupled to the attachment plate 104, and an outer skin 102 forming an airfoil.

The attachment assembly 106, as noted, is coupled to the attachment plate 104 and extends along the spanwise direction S through the airfoil. The attachment assembly 106 provides structural rigidity to the airfoil, and more specifically to the outer skin 102. In the embodiment depicted, the airfoil defines a span 108 along the spanwise direction S, and the attachment assembly 106 extends along the spanwise direction S for at least 25% of the span 108. In particular, for the embodiment depicted, the attachment assembly 106 extends along the spanwise direction S for at least 50% of the span 108, such as for at least 60% of the span 108. In such a manner, the attachment assembly 106 may provide a desired amount of structural rigidity to the airfoil.

Notably, it will be appreciated that in certain exemplary aspects the attachment assembly 106 may be coupled directly to the outer skin 102 without a separate structure extending through the airfoil along the spanwise direction S.

As will be appreciated, the attachment assembly 106 is generally configured to attach and/or support the outer skin 102 forming the airfoil. As the outer skin 102/airfoil and attachment assembly 106 are solely attached to the attachment plate 104, and no other structure outward of the attachment plate 104, the stator vane assembly 100, and the airfoil formed by the outer skin 102, may be referred to as a cantilevered stator vane assembly 100 and airfoil.

Figure 3:
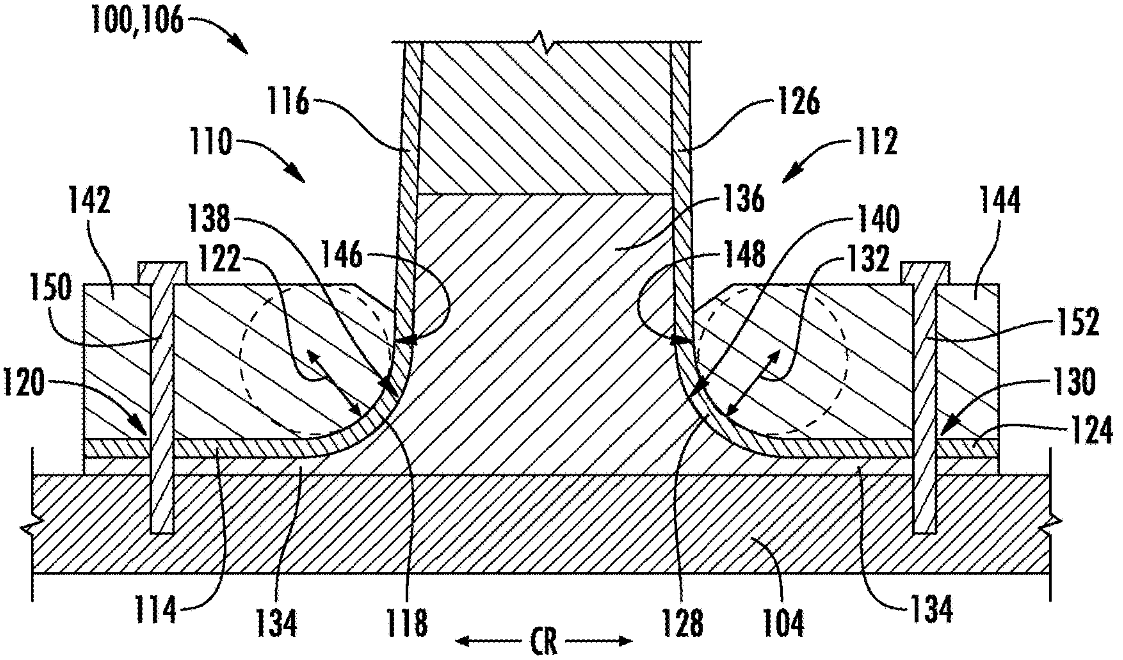
FIG. 3 is a close-up, cross-sectional view of an attachment assembly and an attachment plate of the stator vane assembly of FIG. 2, as viewed along a chordwise direction.
Figure 4:
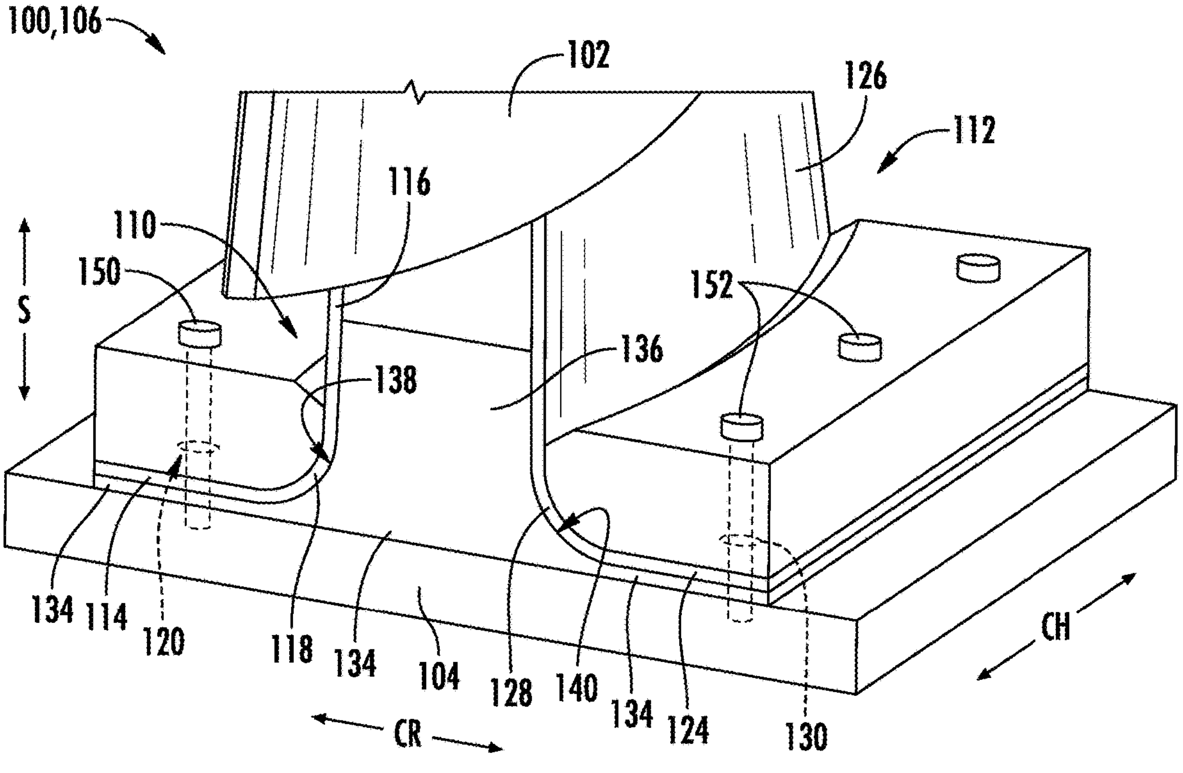
FIG. 4 is a perspective, cross-sectional view of the portion of the exemplary stator vane assembly depicted in FIG. 3.

Referring now to FIGS. 3 and 4, close-up, cross-sectional views are provided of the stator vane assembly 100 of FIG. 2. In particular, FIG. 3 provides a close-up, cross-sectional view of the attachment assembly 106 and attachment plate 104 of the stator vane assembly 100 of FIG. 2, as viewed along the chordwise direction CH; and FIG. 4 provides a perspective, cross-sectional view of the portion of the exemplary stator vane assembly 100 depicted in FIG. 3. Notably, cross-hatchings are not provided in FIGS. 3 and 4 for clarity purposes only.

For the embodiment shown, the attachment assembly 106 of the stator vane assembly 100 includes a first flange member 110 attached to the attachment plate 104 and extending along the chordwise direction CH (see, particularly, FIG. 4), and a second flange member 112 attached to the attachment plate 104 and extending along the chordwise direction CH (see, particularly, FIG. 4). As will be appreciated, for the embodiment shown the first flange member 110 is spaced from the second flange member 112 in the crosswise direction CR.

More specifically, for the embodiment shown, the first flange member 110 includes a first flange 114, a first side wall 116, and a first radius wall 118 extending between the first flange 114 and the first side wall 116. The first flange 114 generally extends in the crosswise direction CR and the chordwise direction CH and defines a plurality of first attachment points 120. The first side wall 116 generally extends in the spanwise direction S. The first radius wall 118 defines a first radius of curvature 122 (see, particularly, FIG. 3), which may allow for the first radius wall 118 to better accommodate bending forces on the stator vane assembly 100 in the crosswise direction CR.

Similarly, for the embodiment shown, the second flange member 112 includes a second flange 124, a second side wall 126, and a second radius wall 128 extending between the second flange 124 and the second side wall 126. The second flange 124 generally extends in the crosswise direction CR and in the chordwise direction CH and defines a plurality of second attachment points 130. The second side wall 126 generally extends in the spanwise direction S. The second radius wall 128 defines a second radius of curvature 132 (see, particularly, FIG. 3), which may similarly allow for the second radius wall 128 to better accommodate bending forces on the stator vane assembly 100 in the crosswise direction CR.

In order to further reinforce the first flange member 110 and the second flange member 112, the attachment assembly 106 further includes a crosswise support member 134 extending between the first flange member 110 and the second flange member 112. The crosswise support member 134 is positioned in between the attachment plate 104 and the first flange member 110 and between the attachment plate 104 and the second flange member 112. More specifically, the crosswise support member 134 extends at least from the plurality of first attachment points 120 to the plurality of second attachment points 130. More specifically, still, the crosswise support member 134 extends at least from a location between the first flange 114 of the first flange member 110 and the attachment plate 104 to a location between the second flange 124 of the second flange member 112 and the attachment plate 104. The crosswise support member 134 may brace the first flange member 110 with the second flange member 112, increasing a structural rigidity of the attachment assembly 106.

Further, for the embodiment shown the attachment assembly 106 further includes an inner radii support 136 extending from the first radius wall 118 of the first flange member 110 to the second radius wall 128 of the second flange member 112. More specifically, the inner radii support 136 includes a first surface 138 adjacent to the first radius wall 118 and defining a radius of curvature complementary to the first radius of curvature 122 and a second surface 140 adjacent to the second radius wall 128 and defining a radius of curvature complementary to the second radius of curvature 132.

As used herein, the term "complementary" with reference to a radius of curvature of two radii of curvature, refers to the two radii of curvature being equal, or a larger of two the radii of curvature being no more than 10% greater than a smaller of the two radii of curvature. Further, the term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

In such a manner, the inner radii support 136 may provide structural support for the first radius wall 118 and the second radius wall 128 of the first flange member 110 and the second flange member 112, respectively. Such may assist with supporting bending forces on the stator vane assembly 100 in the crosswise direction CR.

Notably, for the embodiment depicted, the inner radii support 136 further extends along the spanwise direction S between the first side wall 116 of the first flange member 110 and the second side wall 126 of the second flange member 112. More specifically, the first surface 138 of the inner radii support 136 is further positioned adjacent to the first side wall 116 of the first flange member 110, and the second surface 140 of the inner radii support 136 is further positioned adjacent to the second side wall 126 of the second flange member 112. In such a manner, the inner radii support 136 may provide support for the stator vane assembly 100 against bending forces and the crosswise direction CR.

Moreover, referring still to FIGS. 3 and 4, the attachment assembly 106 further includes a first retainer 142 positioned adjacent to the first radius wall 118 and a second retainer 144 positioned adjacent to the second radius wall 128. The first retainer 142 is attached to the attachment plate 104 through the first flange 114 of the first flange member 110 and the second retainer 144 is attached to the attachment plate 104 through the second flange 124 of the second flange member 112.

The first retainer 142 and the second retainer 144 are configured to support the first flange member 110 and the second flange member 112. In particular, the first retainer 142 includes a surface 146 defining a radius of curvature complementary to the first radius of curvature 122 of the first radius wall 118. Similarly, the second retainer 144 includes a surface 148 defining a radius of curvature complementary to the second radius of curvature 132 of the second radius wall 128. In certain embodiments, such as the exemplary embodiment depicted, the surface 146 of the first retainer 142 may extend along an entirety of an outer surface of the first radius wall 118 (not labeled) and the surface 148 of the second retainer 144 may extend along an entirety of an outer surface (not labeled) of the second radius wall 128.

It will be appreciated, however, that in other exemplary embodiments, the surface 146 of the first retainer 142 may only extend partially along the outer surface of the first radius wall 118, and the surface 148 of the second retainer 144 may similarly extend only partially along the outer surface of the second radius wall 128. For example, one or both of the surfaces 146, 148 of the first retainer 142 and the second retainer 144, respectively, may extend between 10% and 90% such as between 20% and 80%, along the outer surfaces of the first radius wall 118 and second radius wall 128, respectively.

In such a manner, the first retainer 142 and the second retainer 144 may provide for additional support of the first flange member 110 at the first radius wall 118 and of the second flange member 112 at the second radius wall 128, respectively. Inclusion of the first retainer 142 and the second retainer 144 may further assist with supporting bending forces on the stator vane assembly 100 in the crosswise direction CR.

Referring still to FIGS. 3 and 4, as noted above, the first flange 114 defines the plurality of first attachment points 120 and the second flange 124 defines the plurality of second attachment points 130. Notably, in the embodiment depicted, the first retainer 142, the first flange 114, and a portion of the crosswise support member 134 positioned between the first flange 114 and the attachment plate 104 are each attached to the attachment plate 104 using a common attachment device, and more specifically, using a plurality of first fasteners 150. The plurality of first fasteners 150, for the embodiment depicted, each extend through the first retainer 142, through the first flange 114, and through the crosswise support member 134 into the attachment plate 104. The plurality of first fasteners 150 may be a plurality of rotatably engaged fasteners, such as bolts, screws, or the like.

Similarly, in the embodiment depicted, the second retainer 144, the second flange 124, and a portion of the crosswise support member 134 positioned between the second flange 124 and the attachment plate 104 are each also attached to the attachment plate 104 using a common attachment device, and more specifically, a plurality of second fasteners 152. The plurality of second fasteners 152, for the embodiment depicted, each extend through the second retainer 144, through the second flange 124, and through the crosswise support member 134 into the attachment plate 104. The plurality of second fasteners 152 may similarly be a plurality of rotatably engaged fasteners, such as bolts, screws, or the like.

As will be appreciated, in the embodiment depicted the first flange 114, the first radius wall 118, and the first side wall 116 are all formed integrally together as a unitary component, and similarly, the second flange 124, the second radius wall 128, and the second side wall 126 are all formed integrally together as a unitary component. Moreover, in at least certain exemplary embodiments, the first flange member 110 and the second flange member 112 may each be formed of a composite material. Such may reduce an overall weight of the stator vane assembly 100.

Further, in the embodiment depicted, the crosswise support member 134 and the inner radii support 136 are formed integrally together as a unitary component. In at least certain exemplary embodiments, the crosswise support member 134 may be formed of a metal material, and more specifically, when the crosswise support member 134 and the inner radii support 136 are formed integrally together as a unitary component, the inner radii support 136 may also be formed of a metal material. Similarly, in the embodiment depicted, the first retainer 142 and the second retainer 144 may each also be formed of a metal material.

It will be appreciated that as used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc. Similarly, as used herein, the term "metal material" refers to metal and metal alloy materials.

Further, referring particular to FIG. 4, it will be appreciated that the stator vane assembly 100 further includes the outer skin 102 forming the airfoil (see also, FIG. 2). The outer skin 102 may be coupled to the first flange member 110 and the second flange member 112. For example, in certain exemplary embodiments, the outer skin 102 may be affixed to the first flange member 110 and the second flange member 112 using an intermediate foam material (not shown).

Additionally, or alternatively, however, the outer skin 102 may be affixed to the first flange member 110 and the second flange member 112 using one or more mechanical fasteners. Additionally, or alternatively, still, in other exemplary embodiments, the outer skin 102 may be formed integrally with the first flange member 110, the second flange member 112, or both.

It will be appreciated, however, that in still other exemplary embodiments, the stator vane assembly 100 may be configured in any other suitable manner. For example, in other exemplary embodiments, the crosswise support member 134, the inner radii support 136, the first retainer 142, the second retainer 144, or a combination thereof may be formed of a composite material instead of a metal material. Such may reduce an overall weight of the stator vane assembly 100. Moreover, although in the embodiment depicted, the crosswise support member 134 is depicted formed integrally with the inner radii support 136, in other exemplary embodiments, these components may be formed separately from one another. Further, in other exemplary embodiments, the stator vane assembly 100 may not include each of the crosswise support member 134, the inner radii support 136, the first retainer 142, and the second retainer 144, and instead may include any suitable combination of such components to achieve a desired structural rigidity for the attachment assembly 106 of the stator vane assembly 100.

Further, in other exemplary embodiments, still other suitable configurations may be provided. For example, referring now to FIG. 5, a cross-sectional, schematic view of a stator vane assembly 100 in accordance with another exemplary embodiment of the present disclosure is provided. The exemplary stator vane assembly 100 of FIG. 5 may be configured in a similar manner as exemplary stator vane assembly 100 described above with reference to FIGS. 2 through 4. The same or similar numbers may refer to the same or similar parts.

Figure 5:
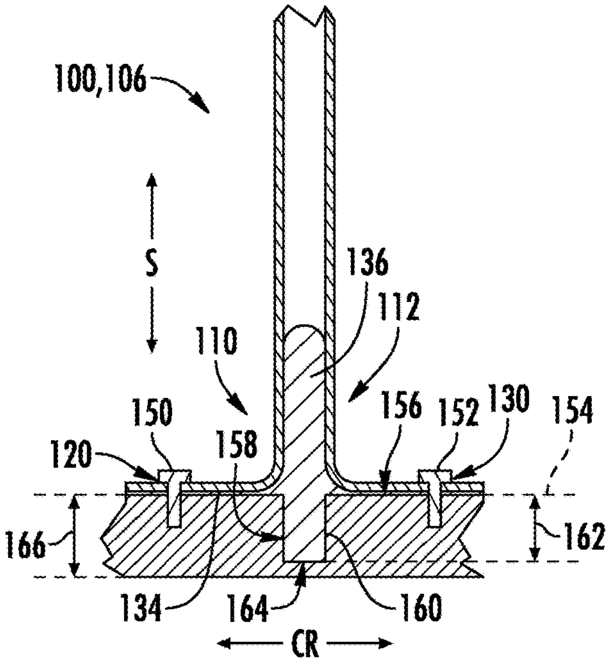
FIG. 5 is a close-up, cross-sectional view of an attachment assembly and an attachment plate of a stator vane assembly in accordance with an exemplary embodiment of the present disclosure as viewed along a chordwise direction.

For example, the exemplary stator vane assembly 100 of FIG. 5 generally includes an attachment plate 104 and an attachment assembly 106 having a first flange member 110, a second flange member 112, and a crosswise support member 134. The first flange member 110 and the second flange member 112 are each attached to the attachment plate 104. Notably, the attachment plate 104 defines an attachment plane 154. The attachment plane 154 is defined in a crosswise direction CR and a chordwise direction CH (see FIG. 4) of the stator vane assembly 100, along an outer surface 156 of the attachment plate 104 where the first flange member 110 and the second flange member 112 are attached to the attachment plate 104.

However, for the embodiment depicted, the attachment plate 104 defines an opening 158 and the attachment assembly 106 further includes a base extension 160 coupled to or formed integrally with the crosswise support member 134. The base extension 160 extends into the opening 158 of the attachment plate 104, past the attachment plane 154. For the embodiment depicted, the base extension 160 defines an interference fit with the opening 158 of the attachment plate 104 to fix the base extension 160 to the attachment plate 104.

The base extension 160 defines a length 162 in a spanwise direction S from the attachment plane 154 to a distal end 164 of the base extension 160. In the embodiment depicted, the length 162 may be equal to at least greater than or equal to 25% of a maximum thickness 166 of the attachment plate 104. In the embodiment depicted, the length 162 is less than the maximum thickness 166 of the attachment plate 104 (it being appreciated, however, that in other embodiments, the length 162 may be greater than the maximum thickness 166 of the attachment plate 104).

For the embodiment shown, the base extension 160 is formed integrally with the crosswise support member 134 is a unitary part.

Inclusion of the base extension 160 may allow for bending forces in the crosswise direction CR of the stator vane assembly 100 to be more directly transferred to the attachment plate 104, potentially alleviating bending loads on, e.g., the plurality of first fasteners 150 and the plurality of second fasteners 152 of the stator vane assembly 100.

It will be appreciated, however, that in other embodiments, the crosswise support member 134, the base extension 160, or both may have any other suitable configuration. For example, referring now to FIG. 6, a stator vane assembly 100 in accordance with another exemplary aspect of the present disclosure is provided. The exemplary stator vane assembly 100 of FIG. 6 may be configured in substantially the same manner as exemplary stator vane assembly 100 of FIG. 5. The same or similar numbers may refer to the same or similar parts.

Figure 6:
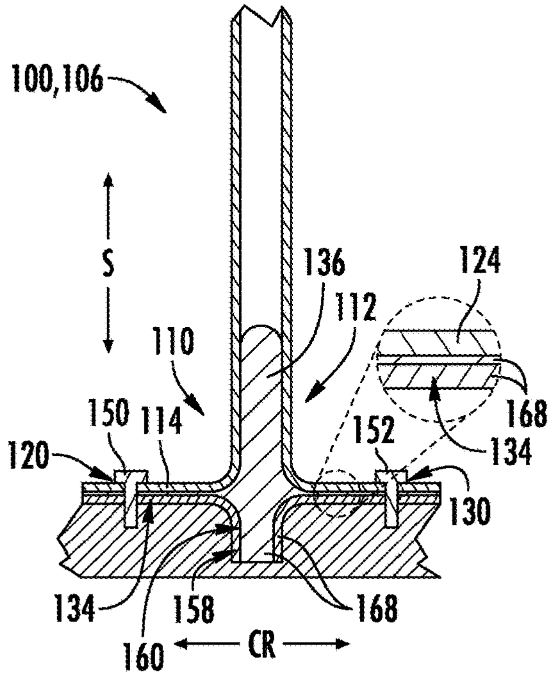
FIG. 6 is a close-up, cross-sectional view of an attachment assembly and an attachment plate of a stator vane assembly in accordance with another exemplary embodiment of the present disclosure as viewed along a chordwise direction.

In such a manner, it will be appreciated that the exemplary stator vane assembly 100 of FIG. 6 includes an attachment assembly 106 having a crosswise support member 134 and a base extension 160. However, for the embodiment depicted, as is shown more clearly in the callout circle, the base extension 160 includes a plurality of layers 168 bonded together. Notably, for the embodiment depicted, the crosswise support member 134 is similarly formed of a plurality of layers 168. In particular, the crosswise support member 134 is formed integrally with the base extension 160, such that the crosswise support member 134 includes the same plurality of layers 168 as the base extension 160.

The plurality of layers 168 may provide unique structural benefits for the base extension 160 and the crosswise support member 134. This may allow for a tailoring of the structural support of the stator vane assembly 100.

Figure 7:
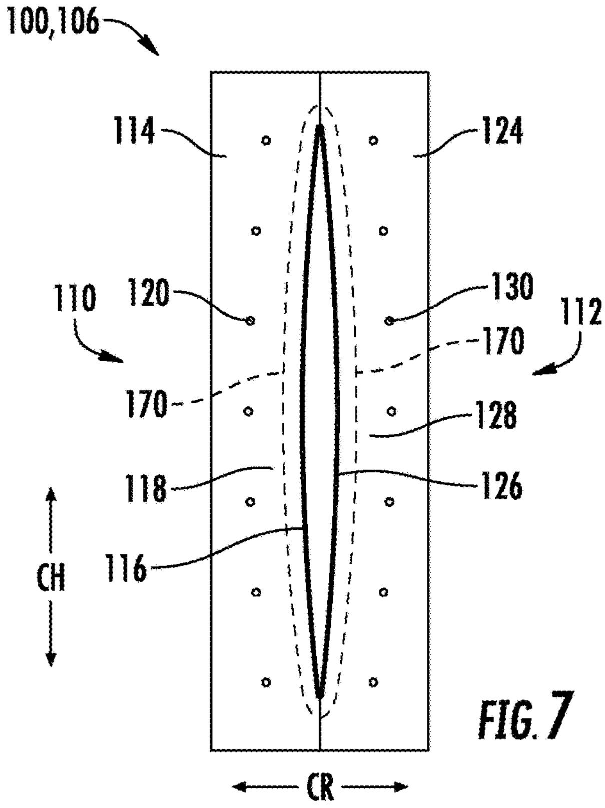
FIG. 7 is a view along a spanwise direction of a stator vane assembly in accordance with an exemplary aspect of the present disclosure.

Referring now to FIG. 7, a view along a spanwise direction S of a stator vane assembly 100 in accordance with an exemplary aspect of the present disclosure is provided. The stator vane assembly 100 of FIG. 7 may be configured in a similar manner as one or more of the exemplary stator vane assemblies 100 of FIGS. 2 through 6. The same or similar numbers may refer to the same or similar parts For example, the stator vane assembly 100 of FIG. 7 generally includes a first flange member 110 and a second flange member 112. The first flange member 110 includes a first flange 114, a first radius wall 118, and a first side wall 116. Similarly, the second flange member 112 includes a second flange 124, a second radius wall 128, and a second side wall 126. The first flange member 110 defines a plurality of first attachment points 120 and the second flange member 112 defines a plurality of second attachment points 130. A midpoint of the first radius wall 118 and a midpoint of the second radius wall 128 is indicated in FIG. 7 with a phantom line 170.

For the embodiment depicted, the first flange member 110 and the second flange member 112, and more specifically, the first flange 114 and the second flange 124, together define a rectangular shape in the crosswise direction CR and the chordwise direction CH (also referred to as a rectangular footprint). Moreover, as is indicated by the phantom line 170, the first radius wall 118 and the second radius wall 128 each define a substantially constant radius of curvature along the chordwise direction CH. With such a configuration, the pluralities of first attachment points 120 and second attachment points 130 are spaced substantially equally from the respective first side wall 116 and a second side wall 126 in the crosswise direction CR.

It will be appreciated, however, that in other exemplary embodiments, other suitable configurations may be provided for the attachment assembly 106, and more specifically, for the first flange member 110 and the second flange member 112. For example, referring now to FIG. 8, a view along a spanwise direction S of a stator vane assembly 100 in accordance with another exemplary aspect of the present disclosure is provided. The stator vane assembly 100 of FIG. 7 may be configured in a similar manner as one or more of the exemplary stator vane assemblies 100 of FIGS. 2 through 6. The same or similar numbers may refer to the same or similar parts.

Figure 8:
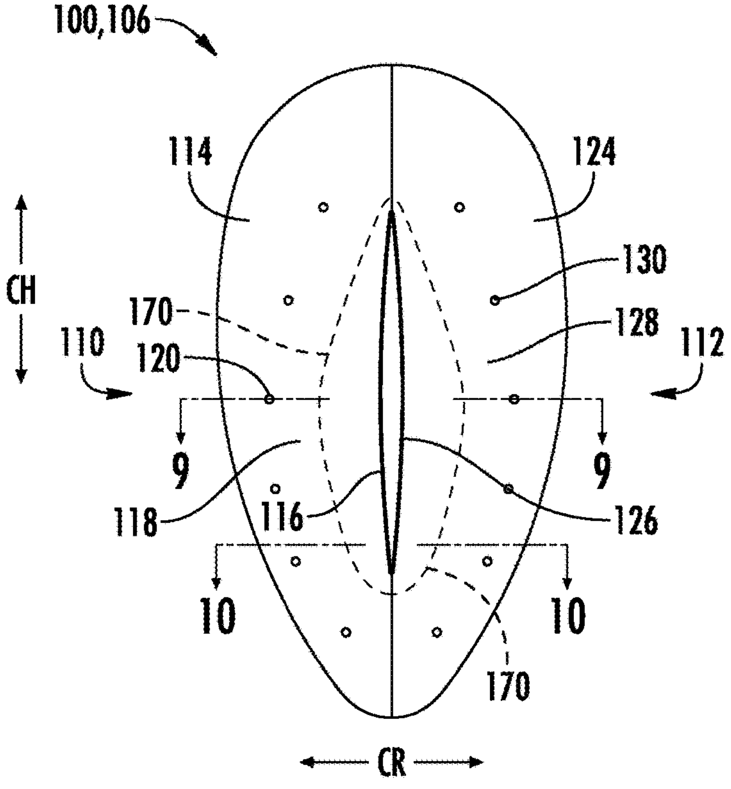
FIG. 8 is a view along a spanwise direction of a stator vane assembly in accordance with another exemplary aspect of the present disclosure.

For example, the stator vane assembly 100 of FIG. 8 generally includes a first flange member 110 and a second flange member 112. The first flange member 110 includes a first flange 114, a first radius wall 118, and a first side wall 116. Similarly, the second flange member 112 includes a second flange 124, a second radius wall 128, and a second side wall 126. The first flange member 110 defines a plurality of first attachment points 120 and the second flange member 112 defines a plurality of second attachment points 130. A midpoint of the first radius wall 118 and a midpoint of the second radius wall 128 is indicated in FIG. 8 with a phantom line 170.

However, for the embodiment depicted, the first flange member 110 and the second flange member 112, and more specifically, the first flange 114 and the second flange 124, together define a contoured shape in the crosswise direction CR and the chordwise direction CH (also referred to as a contoured footprint).

Further, for the embodiment depicted, as is indicated by the phantom line 170, the first radius wall 118 of the first flange member 110 and the second radius wall 128 of the second flange member 112 each define a variable radius of curvature along the chordwise direction CH. More specifically, the first radius wall 118 of the first flange member 110 defines a first radius of curvature 122 that varies along the chordwise direction CH (see, FIGS. 9 and 10, below), and the second radius wall 128 of the second flange member 112 defines a second radius of curvature 132 that varies along the chordwise direction CH (see, FIGS. 9 and 10, below). Such may be facilitated at least in part by the contoured shape defined by the first flange 114 and the second flange 124.

Moreover, it will be appreciated that with such a configuration, the plurality of first attachment points 120 defined by the first flange 114 define a variable spacing from the first side wall 116 along the crosswise direction CR, and similarly, the plurality of second attachment points 130 defined by the second flange 124 define a variable spacing from the second side wall 126 along the crosswise direction CR. Such a configuration may be facilitated at least in part by the contoured shape defined by the first flange 114 and the second flange 124, and in turn may facilitate the variance in the first radius of curvature 122 and the second radius of curvature 132 along the chordwise direction CH.

Figure 9:
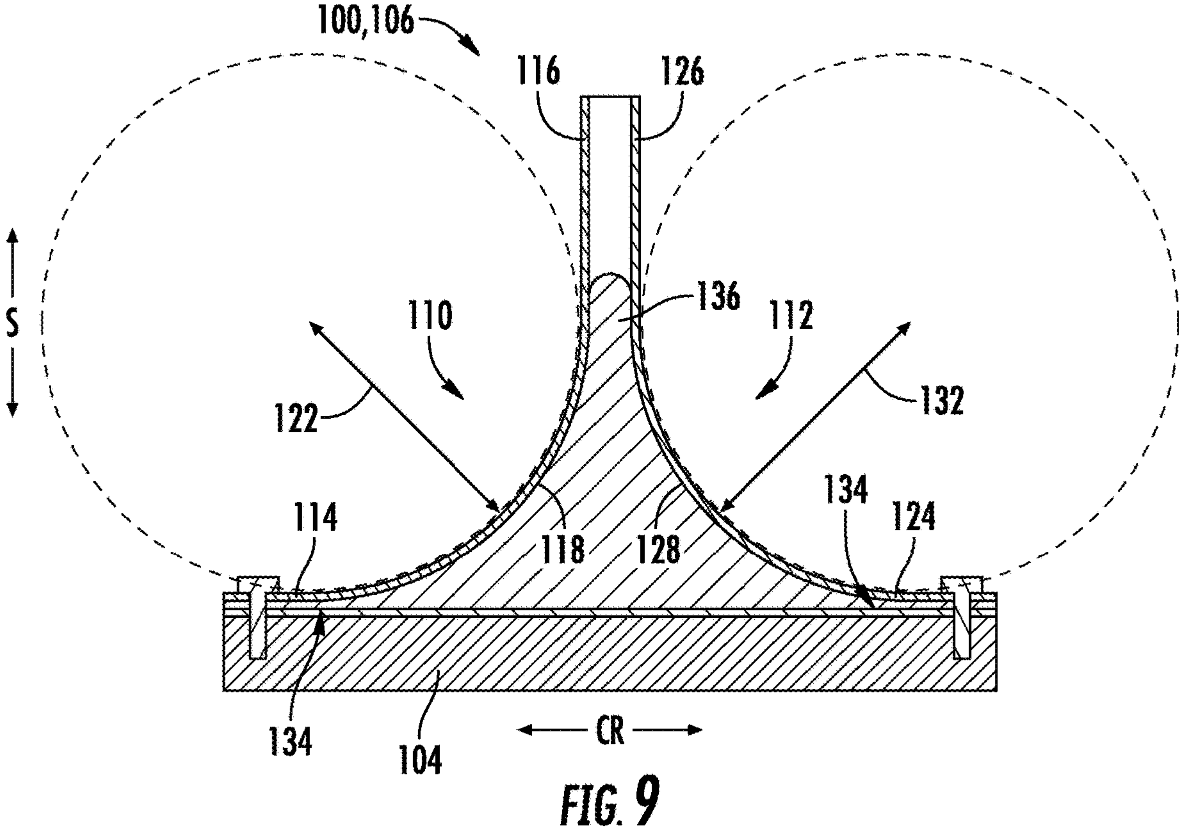
FIG. 9 is a close-up, cross-sectional view of the exemplary stator vane assembly of FIG. 8 as viewed along Line 9-9 in FIG. 8.
Figure 10:
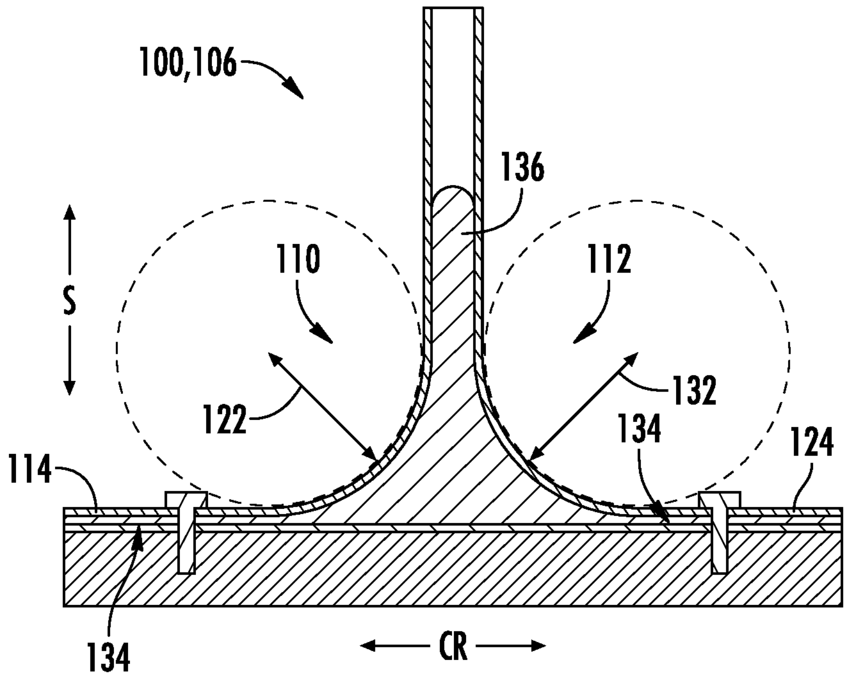
FIG. 10 is a close-up, cross-sectional view of the exemplary stator vane assembly of FIG. 8 as viewed along Line 10-10 in FIG. 8.

In particular, referring now to FIGS. 9 and 10, schematic, cross-sectional views of the stator vane assembly 100 of FIG. 8 are provided, as viewed along Line 9-9 and along Line 10-10 in FIG. 8, respectively.

As noted, the first flange member 110 of the stator vane assembly 100 includes the first flange 114, the first radius wall 118, and the first side wall 116, and the second flange member 112 of the stator vane assembly 100 includes the second flange 124, the second radius wall 128, and the second side wall 126. The first radius wall 118 defines the first radius of curvature 122, and the second radius wall 128 defines the second radius of curvature 132. The view of FIG. 9 is from a first location at a middle of the first flange member 110 and second flange member 112 along the chordwise direction CH (e.g., a middle 25%) and the view of FIG. 10 is taken from a second location outside the middle of the first flange member 110 and the second flange member 112 along the chordwise direction CH. For the embodiment depicted, the first radius of curvature 122 and the second radius of curvature 132 of the first location in FIG. 9 is greater than the first radius of curvature 122 and the second radius of curvature 132, respectively, at the second location in FIG. 10 (e.g., at least 10% greater, such as at least 20% greater, such as up to an infinite amount greater (i.e., where the second radius of curvature 132 at, e.g., a forward or aft tip approaches zero)).

In such a manner, the stator vane assembly 100 may be configured to provide a larger amount of support against bending forces in the crosswise direction CR at the middle of the first flange member 110 and the second flange member 112 and a lesser amount of support against bending forces in the crosswise direction CR outside the middle of the first flange member 110 and the second flange member 112. Such a configuration may concentrate the support where it is most useful, and may save weight and space outside of such location.

Notably, for the embodiment of FIGS. 9 and 10, a crosswise support member 134 is formed of a plurality of layers.

Further, it will be appreciated that in other exemplary embodiments of the present disclosure, still other suitable configurations may be provided. For example, referring briefly to FIG. 11, a cross-sectional view of a stator vane assembly 100 in accordance with another exemplary embodiment of the present disclosure is provided, as viewed along a chordwise direction CH of the stator vane assembly 100.

The exemplary stator vane assembly 100 of FIG. 11 may be configured in a similar manner as one or the exemplary stator vane assemblies 100 described hereinabove. For example, the stator vane assembly 100 generally includes an attachment plate 104 and an attachment assembly 106, the attachment assembly 106 including a first flange member 110, a second flange member 112, and a crosswise support member 134. Further, as with the embodiments described above with reference to FIGS. 5 and 6, for the embodiment of FIG. 11, the attachment plate 104 defines an opening 158 and the attachment assembly 106 further includes a base extension 160 coupled to or formed inwardly with the crosswise support member 134. Notably, for the embodiment of FIG. 11, the base extension 160 is relatively wide along the crosswise direction CR and relatively shallow along the spanwise direction S.

Figure 11:
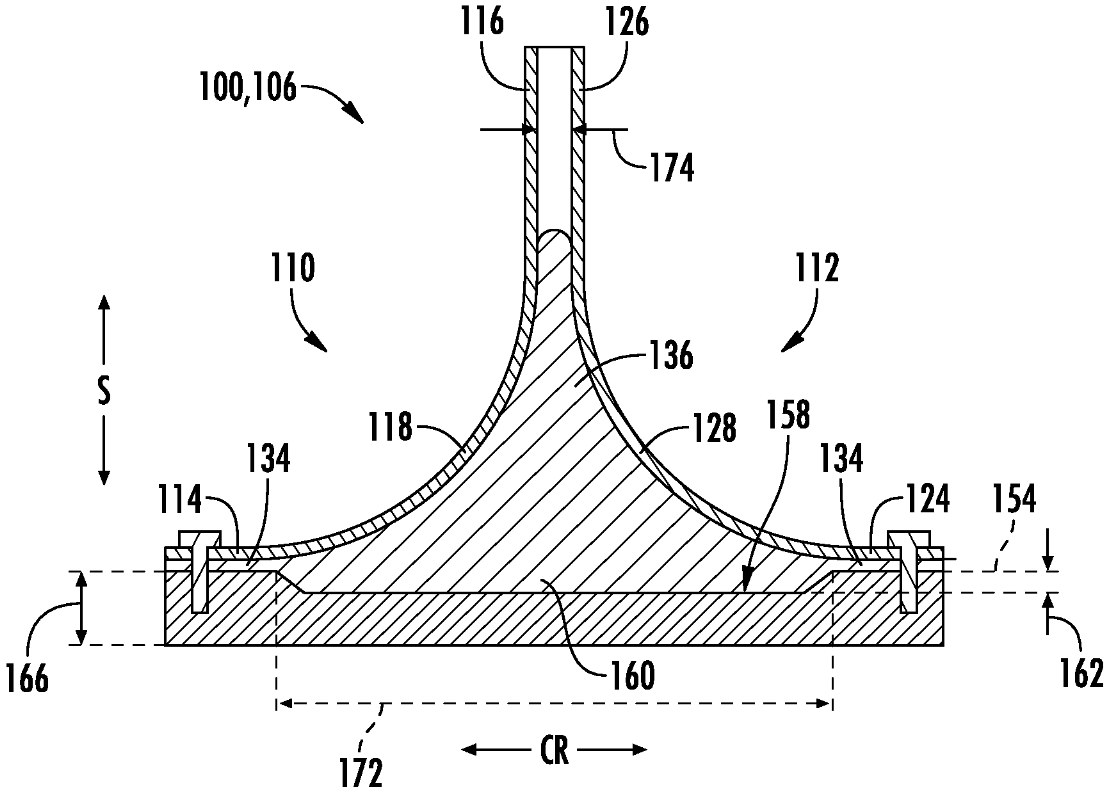
FIG. 11 is a close-up, cross-sectional view of an attachment assembly and an attachment plate of a stator vane assembly in accordance with another exemplary embodiment of the present disclosure as viewed along a chordwise direction.

In particular, for the embodiment of FIG. 11, a first radius wall 118 of the first flange member 110 defines a relatively large radius of curvature (see, e.g., first radius of curvature 122 of FIG. 9), and similarly, a second radius wall 128 of the second flange member 112 defines a relatively large radius of curvature (see, e.g., second radius of curvature 132 of FIG. 9). Such a configuration may provide a sufficient spacing for the relatively wide base extension 160 along the crosswise direction CR.

For example, in the embodiment of FIG. 11, the base extension 160 defines a width 172 along the crosswise direction CR greater than a side wall separation 174 between a first side wall 116 of the first flange member 110 and a second side wall 126 of the second flange member 112. In particular, the width 172 may be at least 10% greater than the sidewall separation 174, such as at least 50% greater than the sidewall separation 174, such as at least 100% greater than the sidewall separation 174, such as up to 20 times the sidewall separation 174.

Moreover, in the embodiment depicted, the base extension 160 defines a length 162 in the spanwise direction S. For the embodiment depicted, the length 162 is at least 5% of a maximum thickness 166 of the attachment plate 104, and up to 50% of the maximum thickness 166 of the attachment plate 104. Such may provide for additional support for bending forces on the stator vane assembly 100 in the crosswise direction CR, while still allowing for a relatively shallow profile in the spanwise direction S. Further, the configuration of FIG. 11 may more easily facilitate radial side walls defining relatively large radii of curvature (see, e.g., FIG. 9, above).

It will be appreciated that in other exemplary embodiments, the base extension 160 may have still other suitable configurations. For example, in other example embodiments, the base extension 160 may define a shape in the view of, e.g., FIG. 5, FIG. 6, FIG. 11 (i.e., a plane defined by the crosswise direction CR and the spanwise direction S). The shape may be, e.g., a dovetail shape, or other suitable shape diverging as it moves inward along the spanwise direction S.

Further aspects are provided by the subject matter of the following clauses:

A stator vane assembly defining a chordwise direction and a crosswise direction perpendicular to the chordwise direction, the stator vane assembly comprising: an attachment plate; and an attachment assembly coupled to the attachment plate, the attachment assembly comprising: a first flange member attached to the attachment plate and extending along the chordwise direction; a second flange member attached to the attachment plate and extending along the chordwise direction, the first flange member spaced from the second flange member in the crosswise direction; and a crosswise support member extending between the first and second flange members and positioned between the attachment plate and the first flange member and between the attachment plate and the second flange member.

The stator vane assembly of one or more of the preceding clauses, wherein the first flange member defines a plurality of first attachment points with the attachment plate, wherein the second flange member defines a plurality of second attachment points with the attachment plate, and wherein the crosswise support member extends at least from the plurality of first attachment points to the plurality of second attachment points.

The stator vane assembly of one or more of the preceding clauses, wherein the first flange member comprises a first flange, a first side wall, and a first radius wall extending between the first flange and the first side wall, wherein the second flange member comprises a second flange, a second side wall, and a second radius wall extending between the second flange and the second side wall, wherein the attachment assembly further comprises an inner radii support extending from the first radius wall to the second radius wall.

The stator vane assembly of one or more of the preceding clauses, wherein the first flange member comprises a first flange, a first side wall, and a first radius wall extending between the first flange and the first side wall, wherein the second flange member comprises a second flange, a second side wall, and a second radius wall extending between the second flange and the second side wall, wherein the attachment assembly further comprises a first retainer attached to the attachment plate through the first flange and positioned adjacent to the first radius wall and a second retainer attached to the attachment plate through the second flange and positioned adjacent to the second radius wall.

The stator vane assembly of one or more of the preceding clauses, wherein the first flange member and the second flange member are formed of a composite material.

The stator vane assembly of one or more of the preceding clauses, wherein the crosswise support member is formed of a metal material.

The stator vane assembly of one or more of the preceding clauses, further comprising: an outer skin forming an airfoil, wherein the outer skin is coupled to or formed integrally with the first flange member and the second flange member.

The stator vane assembly of one or more of the preceding clauses, wherein the airfoil is a cantilevered airfoil supported by the attachment plate.

The stator vane assembly of one or more of the preceding clauses, wherein the stator vane assembly further defines a spanwise direction, and wherein the attachment assembly extends along the spanwise direction through the airfoil.

The stator vane assembly of one or more of the preceding clauses, wherein the airfoil defines a span, and wherein the attachment assembly extends along the spanwise direction for at least 25% of the span.

The stator vane assembly of one or more of the preceding clauses, wherein the attachment plate is rotatable about an axis.

The stator vane assembly of one or more of the preceding clauses, wherein the attachment plate defines an attachment plane, wherein the attachment assembly further comprises a base extension coupled to or formed integrally with the crosswise support member and extending into an opening of the attachment plate past the attachment plane.

The stator vane assembly of one or more of the preceding clauses, wherein the base extension defines an interference fit with the opening of the attachment plate.

The stator vane assembly of one or more of the preceding clauses, wherein the base extension is formed integrally with the crosswise support member.

The stator vane assembly of one or more of the preceding clauses, wherein the base extension comprises a plurality of layers bonded together.

The stator vane assembly of one or more of the preceding clauses, wherein the first flange member comprises a first flange, a first side wall, and a first radius wall extending between the first flange and the first side wall, wherein the first radius wall defines a variable radius of curvature along the chordwise direction.

A gas turbine engine comprising: a fan section comprising a fan; a turbomachine comprising a compressor, a combustor, and a turbine arranged in serial flow order, the turbomachine drivingly coupled to the fan; and a stator vane assembly positioned downstream of the fan, the stator vane assembly defining a chordwise direction and a crosswise direction perpendicular to the chordwise direction, the stator vane assembly comprising: an attachment plate; and an attachment assembly coupled to the attachment plate, the attachment assembly comprising: a first flange member attached to the attachment plate and extending along the chordwise direction; a second flange member attached to the attachment plate and extending along the chordwise direction, the first flange member spaced from the second flange member in the crosswise direction; and a crosswise support member extending between the first and second flange members and positioned between the attachment plate and the first flange member and between the attachment plate and the second flange member.

The gas turbine engine of one or more of the preceding clauses, wherein the fan is an unducted fan, wherein the stator vane assembly comprises an outer skin forming an airfoil, and wherein the airfoil is an outlet guide vane of the unducted fan cantilevered from the attachment plate.

A stator vane assembly defining a chordwise direction and a crosswise direction perpendicular to the chordwise direction, the stator vane assembly comprising: an attachment plate; and an attachment assembly coupled to the attachment plate, the attachment assembly comprising: a first flange member attached to the attachment plate and extending along the chordwise direction, the first flange member including a first radius wall; a second flange member attached to the attachment plate and extending along the chordwise direction, the second flange member including a second radius wall, the first flange member spaced from the second flange member in the crosswise direction; and an inner radii support extending from the first radius wall to the second radius wall.

The stator vane assembly of one or more of the preceding clauses, wherein the attachment assembly further comprises a crosswise support member extending between the first and second flange members and positioned between the attachment plate and the first flange member and between the attachment plate and the second flange member.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A stator vane assembly defining a chordwise direction and a crosswise direction perpendicular to the chordwise direction, the stator vane assembly comprising:

an attachment plate; and an attachment assembly coupled to the attachment plate, the attachment assembly comprising:

a first flange member attached to the attachment plate and extending along the chordwise direction;

a second flange member attached to the attachment plate and extending along the chordwise direction, the first flange member spaced from the second flange member in the crosswise direction;

a crosswise support member extending between the first and second flange members and positioned between the attachment plate and the first flange member and between the attachment plate and the second flange member;

wherein the attachment plate defines an attachment plane, wherein the attachment assembly further comprises a base extension coupled to or formed integrally with the crosswise support member and extending into an opening of the attachment plate past the attachment plane; and wherein the base extension defines an interference fit with the opening of the attachment plate.

2. The stator vane assembly of claim 1, wherein the first flange member defines a plurality of first attachment points with the attachment plate, wherein the second flange member defines a plurality of second attachment points with the attachment plate, and wherein the crosswise support member extends at least from the plurality of first attachment points to the plurality of second attachment points.

3. The stator vane assembly of claim 1, wherein the first flange member comprises a first flange, a first side wall, and a first radius wall extending between the first flange and the first side wall, wherein the second flange member comprises a second flange, a second side wall, and a second radius wall extending between the second flange and the second side wall, wherein the attachment assembly further comprises an inner radii support extending crosswise from the first radius wall to the second radius wall, the inner radii support integrally formed with the crosswise support member.

4. The stator vane assembly of claim 1, wherein the first flange member comprises a first flange, a first side wall, and a first radius wall extending between the first flange and the first side wall, wherein the second flange member comprises a second flange, a second side wall, and a second radius wall extending between the second flange and the second side wall, wherein the attachment assembly further comprises a first retainer attached to the attachment plate through the first flange and positioned adjacent to the first radius wall and a second retainer attached to the attachment plate through the second flange and positioned adjacent to the second radius wall.

5. The stator vane assembly of claim 1, wherein the first flange member and the second flange member are formed of a composite material.

6. The stator vane assembly of claim 5, wherein the crosswise support member is formed of a metal material.

7. The stator vane assembly of claim 1, further comprising:

an outer skin forming an airfoil, wherein the outer skin is coupled to or formed integrally with the first flange member and the second flange member.

8. The stator vane assembly of claim 7, wherein the airfoil is a cantilevered airfoil supported by the attachment plate.

9. The stator vane assembly of claim 7, wherein the stator vane assembly further defines a spanwise direction, and wherein the attachment assembly extends along the spanwise direction through the airfoil.

10. The stator vane assembly of claim 9, wherein the airfoil defines a span, and wherein the attachment assembly extends along the spanwise direction for at least 25% of the span.

11. The stator vane assembly of claim 1, wherein the attachment plate is rotatable about an axis.

12. The stator vane assembly of claim 1, wherein the base extension is formed integrally with the crosswise support member wherein the first flange member comprises a first flange, a first side wall, and a first radius wall extending between the first flange and the first side wall, wherein the second flange member comprises a second flange, a second side wall, and a second radius wall extending between the second flange and the second side wall; and wherein the attachment assembly further comprises an inner radii support extending crosswise across a crosswise gap between the first radius wall and the second radius wall, the inner radii support integrally formed with the crosswise support member.

13. The stator vane assembly of claim 1, wherein the base extension comprises a plurality of layers bonded together.

14. The stator vane assembly of claim 1, wherein the first flange member comprises a first flange, a first side wall, and a first radius wall extending between the first flange and the first side wall, wherein the first radius wall defines a variable radius of curvature along the chordwise direction.

15. A stator vane assembly defining a chordwise direction and a crosswise direction perpendicular to the chordwise direction, the stator vane assembly comprising:

an attachment plate; and an attachment assembly coupled to the attachment plate, the attachment assembly comprising:

a first flange member attached to the attachment plate and extending along the chordwise direction;

a second flange member attached to the attachment plate and extending along the chordwise direction, the first flange member spaced from the second flange member in the crosswise direction; and a crosswise support member extending between the first and second flange members and positioned between the attachment plate and the first flange member and between the attachment plate and the second flange member; and wherein the first flange member comprises a first flange, a first side wall, and a first radius wall extending between the first flange and the first side wall, wherein the first radius wall defines a variable radius of curvature along the chordwise direction.

16. The stator vane assembly of claim 15, wherein the first flange member defines a plurality of first attachment points with the attachment plate, wherein the second flange member defines a plurality of second attachment points with the attachment plate, and wherein the crosswise support member extends at least from the plurality of first attachment points to the plurality of second attachment points.

17. The stator vane assembly of claim 15, wherein the second flange member comprises a second flange, a second side wall, and a second radius wall extending between the second flange and the second side wall, wherein the attachment assembly further comprises an inner radii support extending crosswise from the first radius wall to the second radius wall, the inner radii support integrally formed with the crosswise support member.

18. The stator vane assembly of claim 15, wherein the second flange member comprises a second flange, a second side wall, and a second radius wall extending between the second flange and the second side wall, wherein the attachment assembly further comprises a first retainer attached to the attachment plate through the first flange and positioned adjacent to the first radius wall and a second retainer attached to the attachment plate through the second flange and positioned adjacent to the second radius wall.

19. The stator vane assembly of claim 15, wherein the first flange member and the second flange member are formed of a composite material.

20. The stator vane assembly of claim 19, wherein the crosswise support member is formed of a metal material.

21. The stator vane assembly of claim 15, further comprising:

an outer skin forming an airfoil, wherein the outer skin is coupled to or formed integrally with the first flange member and the second flange member.

22. The stator vane assembly of claim 21, wherein the airfoil is a cantilevered airfoil supported by the attachment plate.

23. The stator vane assembly of claim 21, wherein the stator vane assembly further defines a spanwise direction, and wherein the attachment assembly extends along the spanwise direction through the airfoil.

24. The stator vane assembly of claim 23, wherein the airfoil defines a span, and wherein the attachment assembly extends along the spanwise direction for at least 25% of the span.

25. The stator vane assembly of claim 15, wherein the attachment plate is rotatable about an axis.

* * * * *